(12) United States Patent
Dong et al.

(10) Patent No.: US 11,079,221 B2
(45) Date of Patent: Aug. 3, 2021

(54) METHOD AND APPARATUS OF OPTICAL MODULE ASSEMBLY

(71) Applicant: GOERTEK INC., Shandong (CN)

(72) Inventors: Nanjing Dong, Weifang (CN); Debo Sun, Weifang (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 16/652,359

(22) PCT Filed: Sep. 6, 2018

(86) PCT No.: PCT/CN2018/104391
§ 371 (c)(1),
(2) Date: Mar. 30, 2020

(87) PCT Pub. No.: WO2019/076163
PCT Pub. Date: Apr. 25, 2019

(65) Prior Publication Data
US 2020/0271441 A1    Aug. 27, 2020

(30) Foreign Application Priority Data
Oct. 17, 2017   (CN) .......................... 201710964995.7

(51) Int. Cl.
*G01B 11/27* (2006.01)
*G02B 7/02* (2021.01)

(52) U.S. Cl.
CPC ............ *G01B 11/27* (2013.01); *G02B 7/02* (2013.01)

(58) Field of Classification Search
CPC ................................. G01B 11/27; G02B 7/02
See application file for complete search history.

(56) References Cited

U.S. PATENT DOCUMENTS 6,526,089 B1 * 2/2003 Haeno .................... G02B 27/09
                                                              372/101
7,587,803 B2    9/2009 Montfort et al.
(Continued)

FOREIGN PATENT DOCUMENTS

CN         1685707 A    10/2005
CN       101493562 A     7/2009
(Continued)

OTHER PUBLICATIONS

CN Office Action in Application No. 201710964995.7 dated Apr. 26, 2019.
(Continued)

*Primary Examiner* — Steven Whitesell Gordon
(74) *Attorney, Agent, or Firm* — Maschoff Brennan

(57) ABSTRACT

Provided are a method and an apparatus of optical module assembly, where the method includes: when an optical module to be aligned images, controlling an alignment mechanism clamping a lens to be assembled to move in a set direction by a set movement step; when the alignment mechanism moves each time, collecting light spots imaged by the optical module to be aligned sequentially, and selecting an estimated light spot with a minimum size from the collected light spots; searching for an ideal light spot with a minimum size according to a reduced movement step and the estimated light spot with the minimum size; determining a movement position of the alignment mechanism when the ideal light spot with the minimum size is collected as an optimal position of the alignment mechanism; and controlling the alignment mechanism to move to the optimal position to align the lens to be assembled.

10 Claims, 6 Drawing Sheets

(56) References Cited

U.S. PATENT DOCUMENTS

| | | | |
|---|---|---|---|
| 8,011,087 B2 | 9/2011 | Hsiao | |
| 8,993,924 B2* | 3/2015 | Ryu | B23K 26/53 219/121.72 |
| 9,067,763 B2 | 6/2015 | Strbuncelj | |
| 9,964,717 B2 | 5/2018 | Shi et al. | |
| 2005/0036778 A1 | 2/2005 | DeMonte | |
| 2005/0212951 A1* | 9/2005 | Miyata | G02B 27/62 348/345 |
| 2008/0239320 A1 | 10/2008 | Wu | |
| 2009/0183365 A1* | 7/2009 | Hsiao | G02B 7/02 29/836 |
| 2010/0007944 A1* | 1/2010 | Tanaka | G02B 6/4206 359/344 |
| 2020/0238455 A1* | 7/2020 | Dong | B25J 11/005 |
| 2020/0292837 A1* | 9/2020 | Dong | G02B 7/003 |

FOREIGN PATENT DOCUMENTS

| | | |
|---|---|---|
| CN | 101592787 A | 12/2009 |
| CN | 201974587 U | 9/2011 |
| CN | 102596787 A | 7/2012 |
| CN | 104345469 A | 2/2015 |
| CN | 104406528 A | 3/2015 |
| CN | 104535052 A | 4/2015 |
| CN | 105223661 A | 1/2016 |
| CN | 105721753 A | 6/2016 |
| CN | 205564749 U | 9/2016 |
| CN | 107589512 A | 1/2018 |

OTHER PUBLICATIONS

CN Office Action in Application No. 201710964995.7 dated Nov. 20, 2019.

CN Office Action in Application No. 201710964995.7 dated Jun. 2, 2020.

* cited by examiner

METHOD AND APPARATUS OF OPTICAL MODULE ASSEMBLY

CROSS-REFERENCE TO RELATED APPLICATIONS

The present disclosure refers to Chinese Patent Application No. 2017109649957, filed on Oct. 17, 2017, entitled "Method and Apparatus of Optical Module Assembly", which is hereby incorporated by reference in its entirety.

TECHNICAL FIELD

The present disclosure relates to the field of virtual reality technology, and in particular to a method and an apparatus of optical module assembly.

BACKGROUND

Nowadays, there are more and more optical modules with independent functions in the market to meet diversified market demands. These optical modules can be embedded in other devices to perform their functions, such as camera modules, miniature projection modules, LED (Light Emitting Diode, light emitting diode) optical modules, VR (Virtual Reality)/AR (Augmented Reality) optical modules and so on.

Generally, an optical module is assembled by a plurality of optical elements and other components. For example, the camera module can be assembled by components such as an image sensor, a lens base, a plurality of lenses, and a circuit board. Specifically, the assembly accuracy of the lens plays a decisive role in the optical performance of the optical module. In an optical module assembly method, the optical module images during the assembly process, and whether the lens to be assembled is aligned is determined according to the size of the imaging light spot, and the alignment of the lens to be assembled is continuously adjusted if the lens is not aligned.

However, how to adjust the lens to be assembled to the most rational position according to the size of the imaging light spot of the optical module during the assembly process is an urgent technical problem to be solved.

SUMMARY

Various aspects of the present disclosure provide a method and an apparatus of optical module assembly, which are used to adjust the lens to be assembled to the most rational position according to the size of light spots imaged by the optical module during assembly process, and the assembly accuracy of the optical module is improved thereby.

The present disclosure provides a method of optical module assembly, including:

when an optical module to be aligned images, controlling an alignment mechanism clamping a lens to be assembled to move in a set direction by a set movement step;

when the alignment mechanism moves each time, collecting light spots imaged by the optical module to be aligned sequentially, and selecting an estimated light spot with a minimum size from the collected light spots;

searching for an ideal light spot with a minimum size according to a reduced movement step and the estimated light spot with the minimum size;

determining a movement position of the alignment mechanism when the ideal light spot with the minimum size is collected as an optimal position of the alignment mechanism; and controlling the alignment mechanism to move to the optimal position to align the lens to be assembled.

Further optionally, where the searching for an ideal light spot with a minimum size according to a reduced movement step and the estimated light spot with the minimum size includes:

taking a movement position of the alignment mechanism when the estimated light spot with the minimum size is collected as an estimated optimal position, and controlling the alignment mechanism to move to each of two sides of a center a set time of the reduced movement step, where the estimated optimal position is set as the center; and collecting the light spots imaged by the optical module to be aligned when the alignment mechanism moves to each of two sides of the center the set time of the reduced movement step sequentially, and selecting the ideal light spot with a minimum size from the collected light spots.

Further optionally, where the selecting an estimated light spot with a minimum size from the collected light spots includes:

if sizes of a first number of light spots before a first light spot are all greater than a size of the first light spot, and if sizes of a second number of light spots after the first light spot are all less than the size of the first light spot, determining that the first light spot is the estimated light spot with the minimum size.

Further optionally, where the controlling an alignment mechanism clamping a lens to be assembled to move in a set direction by a set movement step further includes:

controlling the alignment mechanism to move from a beginning or an ending of an assembly area corresponding to the lens to be assembled in the set direction by the set movement step.

Further optionally, where before the searching for an ideal light spot with a minimum size according to a reduced movement step and the estimated light spot with the minimum size further includes:

taking a movement position of the alignment mechanism when the estimated light spot with the minimum size is collected as a suspicion position;

controlling the alignment mechanism to move to the suspicion position and movement positions of a set number before and after the suspicion position, and collecting, by an image acquisition device, light spots imaged by the optical module to be aligned when the alignment mechanism moves each time sequentially; and if in the light spots imaged by the optical module to be aligned when the alignment mechanism moves each time, the collected light spot is with the minimum size when the alignment mechanism moves to the suspicion position, determining that the estimated light spot with the minimum size passes a repeated verification.

Further optionally, where before the optical module to be aligned imaging further includes:

controlling the alignment mechanism to place the lens to be assembled at a specified position of an optical component to be assembled, to obtain the optical module to be aligned; and controlling a power supply component to supply power to an internal light source device of the optical module to be aligned or an external light source device located on an object side of the optical module to be aligned, so that the optical module to be aligned images.

The present disclosure further provides an apparatus of optical module assembly, including:

a movement module, configured to control an alignment mechanism clamping a lens to be assembled to move in a set direction by a set movement step when an optical module to be aligned images;

an estimated light spot with a minimum size selecting module, configured to when the alignment mechanism moves each time, collect light spots imaged by the optical module to be aligned sequentially, and select an estimated light spot with a minimum size from the collected light spots;

an ideal light spot with a minimum size selecting module, configured to search for an ideal light spot with a minimum size according to a reduced movement step and the estimated light spot with the minimum size;

an optimal position selecting module, configured to determine a movement position of the alignment mechanism when the ideal light spot with the minimum size is collected as an optimal position of the alignment mechanism; and an alignment module, configured to control the alignment mechanism to move to the optimal position to align the lens to be assembled.

Further optionally, where the ideal light spot with a minimum size selecting module is specifically configured to:

take a movement position of the alignment mechanism when the estimated light spot with the minimum size is collected as an estimated optimal position, and control the alignment mechanism to move to each of two sides of a center a set time of the reduced movement step, wherein the estimated optimal position is set as the center; and collect the light spots imaged by the optical module to be aligned when the alignment mechanism moves to each of two sides of the center the set time of the reduced movement step sequentially, and select the ideal light spot with a minimum size from the collected light spots.

Further optionally, where the estimated light spot with a minimum size selecting module is specifically configured to:

if sizes of a first number of light spots before a first light spot are all greater than a size of the first light spot, and if sizes of a second number of light spots after the first light spot are all less than the size of the first light spot, determining that the first light spot is the estimated light spot with the minimum size.

Further optionally, where the movement module is further configured to:

control the alignment mechanism to move from a beginning or an ending of an assembly area corresponding to the lens to be assembled in the set direction by the set movement step.

Further optionally, the apparatus further includes a verification module, where the verification module is configured to:

take a movement position of the alignment mechanism when the estimated light spot with the minimum size is collected as a suspicion position;

control the alignment mechanism to move to the suspicion position and movement positions of a set number before and after the suspicion position, and collect, by an image acquisition device, light spots imaged by the optical module to be aligned when the alignment mechanism moves each time sequentially; and if in the light spots imaged by the optical module to be aligned when the alignment mechanism moves each time, the collected light spot is with the minimum size when the alignment mechanism moves to the suspicion position, determine that the estimated light spot with the minimum size passes a repeated verification.

Further optionally, the apparatus further includes a pre-processing module, where the pre-processing module is configured to:

control the alignment mechanism to place the lens to be assembled at a specified position of an optical component to be assembled, to obtain the optical module to be aligned; and control a power supply component to supply power to an internal light source device of the optical module to be aligned or an external light source device located on an object side of the optical module to be aligned, so that the optical module to be aligned images In the present disclosure, during the assembly process of the optical module, when the optical module to be aligned images, the alignment mechanism clamping the lens to be assembled is first controlled to continuously move in a set direction by a set movement step to find the imaged estimated light spot with the minimum size, after the estimated light spot with the minimum size is found, the movement step of the alignment mechanism is reduces to conduct the searching for the ideal light spot with a minimum size. And finally, the lens to be assembled is adjusted to the optimal position according to the movement position of the alignment mechanism when the ideal light spot with a minimum size is collected. On the one hand, the search for the optimal position of the lens to be assembled is transformed into the search for the ideal light spot with the minimum size imaged by the optical module to be assembled, which reduces the alignment difficulty of the lens to be assembled. On the other hand, by the multiple searching processes of the light spot with the minimum size, the assembly accuracy of the optical module is improved.

BRIEF DESCRIPTION OF THE DRAWINGS

In order to more clearly explain the embodiments of the present disclosure or the technical solutions in the prior art, the drawings used in the description of the embodiments or the prior art will be briefly introduced below. Obviously, the drawings in the following description are some embodiments of the present disclosure. For those of ordinary skill in the art, other drawings can be obtained based on these drawings without paying creative labor.

DETAILED DESCRIPTION OF EXAMPLE EMBODIMENTS

For making the purposes, technical solutions and advantages of the embodiments of the present disclosure clearer, the technical solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by those of ordinary skill in the art on the basis of the embodiments in the present disclosure without creative work shall fall within the scope of protection of the present disclosure.

It should be noted that, in the following embodiments of the present disclosure, the optical module refers to the completed product after the alignment is completed and is fixed; the optical module to be aligned refers to the optical module during the assembly process, which may be in an unaligned state or in an aligned state; the optical member to be assembled refers to the semi-finished product of the optical module, and the optical module can only be obtained after the lens to be assembled is aligned and assembled at its specified position and is fixed. The above-mentioned concepts mentioned below can be understood with reference to the above explanations, and will not be repeated.

In a method of optical module assembly, the optical module may image during the assembly process, and analyze whether the lens to be assembled is aligned according to the size of the imaged light spot, and the lens to be assembled is continuously adjusted if it is not aligned. The core of the embodiment of the present disclosure is to provide a method for adjusting the position of the lens to be assembled to be optimal to obtain an optical module with high assembly accuracy. The technical solution proposed by the present disclosure will be specifically described below with reference to the drawings.

Figure 1:
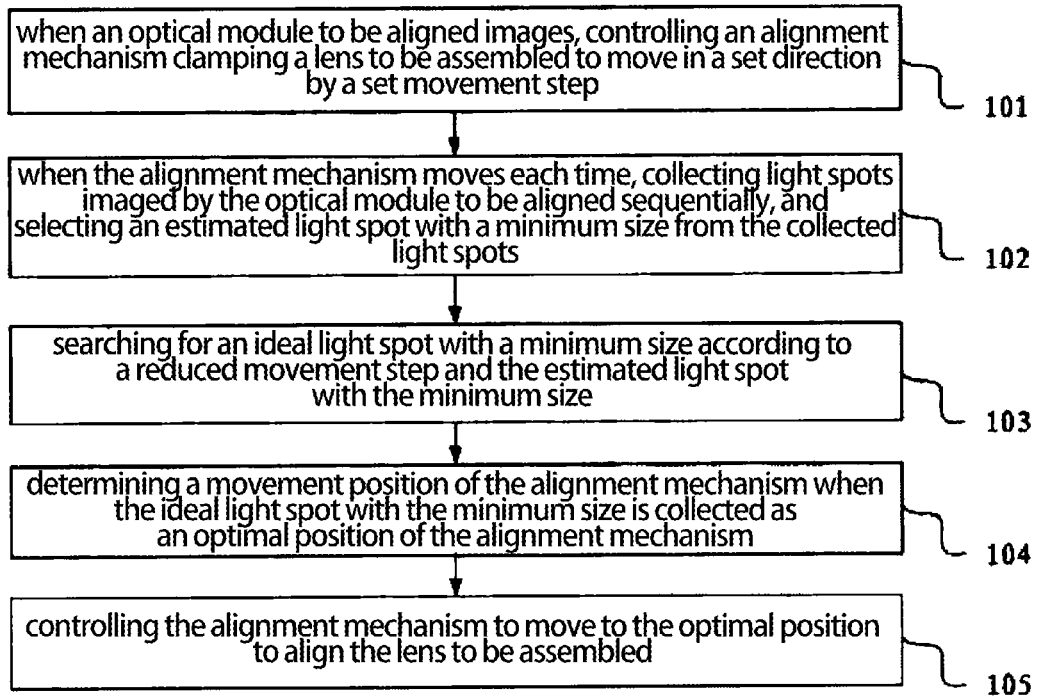
FIG. 1 is a method flowchart of a method of optical module assembly according to an embodiment of the present disclosure.

FIG. 1 is a method flowchart of a method of optical module assembly according to an embodiment of the present disclosure. In conjunction with FIG. 1, the method includes:

Step 101: when an optical module to be aligned images, controlling an alignment mechanism clamping a lens to be assembled to move in a set direction by a set movement step.

Step 102: when the alignment mechanism moves each time, collecting light spots imaged by the optical module to be aligned sequentially, and selecting an estimated light spot with a minimum size from the collected light spots.

Step 103: searching for an ideal light spot with a minimum size according to a reduced movement step and the estimated light spot with the minimum size.

Step 104: determining a movement position of the alignment mechanism when the ideal light spot with the minimum size is collected as an optimal position of the alignment mechanism.

Step 105: controlling the alignment mechanism to move to the optimal position to align the lens to be assembled.

In step 101, the alignment mechanism generally includes a mechanical arm and an alignment head located on the mechanical arm. The mechanical arm is used for moving according to the set motion trajectory, and the alignment head may be a vacuum holding member or a mechanical jig for clamping the lens to be assembled.

The optical module to be aligned includes the optical component to be assembled and the lens to be assembled. The alignment mechanism may place the lens to be assembled at a specified position of the optical component to be assembled, but the specified position may not make the optical module achieve the optimal optical performance. Therefore, the alignment mechanism may carry the lens to be assembled and continuously move the lens to be assembled near a specified position to adjust the lens to be assembled to an optimal position. It should be understood that the optimal position may optimize the optical performance of the optical module.

When the alignment mechanism carries the lens to be assembled and moves continuously, the alignment mechanism may be set to move in the set movement direction by the set movement step, in order to find the possible rule of the result brought by its movement. Optionally, the set movement step may be a movement distance corresponding to each movement, for example, 2 mm; the movement direction may be a forward direction or a backward direction, etc.

In step 102, when the alignment mechanism moves each time, the position of the lens to be assembled clamped by the alignment mechanism changes, so the light spot imaged by the optical module to be assembled also changes accordingly. In the present embodiment, when the alignment mechanism moves to a movement position each time, the light spot imaged by the optical module to be assembled at this time is recorded, and the corresponding relationship between the light spot and the movement position is recorded.

After multiple movements of the alignment mechanism, the image acquisition device will collect multiple light spots of different sizes. According to the principle of optical imaging, the smaller the spot size, the more concentrated the light energy, the clearer the imaging, and the better the performance of the assembled optical module. Therefore, an estimated light spot with a minimum size may be found in advance from a plurality of light spots with different sizes collected by the image acquisition device, and an optimal movement position of the alignment mechanism may be found according to the light spot with the minimum size.

In step 103, the reduced movement step refers to a shorter movement step with regard to the set movement step in step 101. It should be understood that the smaller the reduced movement step, the higher the obtaining accuracy of the ideal light spot with the minimum size. Of course, in order to take into account the alignment efficiency of the alignment mechanism, the present embodiment may reduce the movement step within a reasonable range, for example, it may be reduced to one-half or one-third of the original step. For example, in step 101, the set movement step is 5 mm, and the reduced movement step in this step may be 2.5 mm.

In step 104, after the ideal light spot with the minimum size is obtained, the optimal position of the alignment mechanism may be determined. The optimal position of the alignment mechanism may be considered as a target movement position of the alignment mechanism. When the alignment mechanism moves to this position, the lens to be assembled clamped by the alignment mechanism may be aligned with the optical component to be assembled.

In step 105, after the optimal position is determined, the alignment mechanism may be controlled to move to the optimal position, thereby achieving the alignment of the lenses to be assembled.

In the present embodiment, during the assembly process of the optical module, when the optical module to be aligned images, the alignment mechanism clamping the lens to be assembled is first controlled to continuously move in a set direction by a set movement step to find the imaged estimated light spot with the minimum size, after the estimated light spot with the minimum size is found, the movement step of the alignment mechanism is reduces to conduct the searching for the ideal light spot with a minimum size. And finally, the lens to be assembled is adjusted to the optimal position according to the movement position of the alignment mechanism when the ideal light spot with a minimum size is collected. On the one hand, the search for the optimal position of the lens to be assembled is transformed into the search for the ideal light spot with the minimum size imaged by the optical module to be assembled, which reduces the alignment difficulty of the lens to be assembled. On the other hand, by the multiple searching processes of the light spot with the minimum size, the assembly accuracy of the optical module is improved.

Figure 2A:
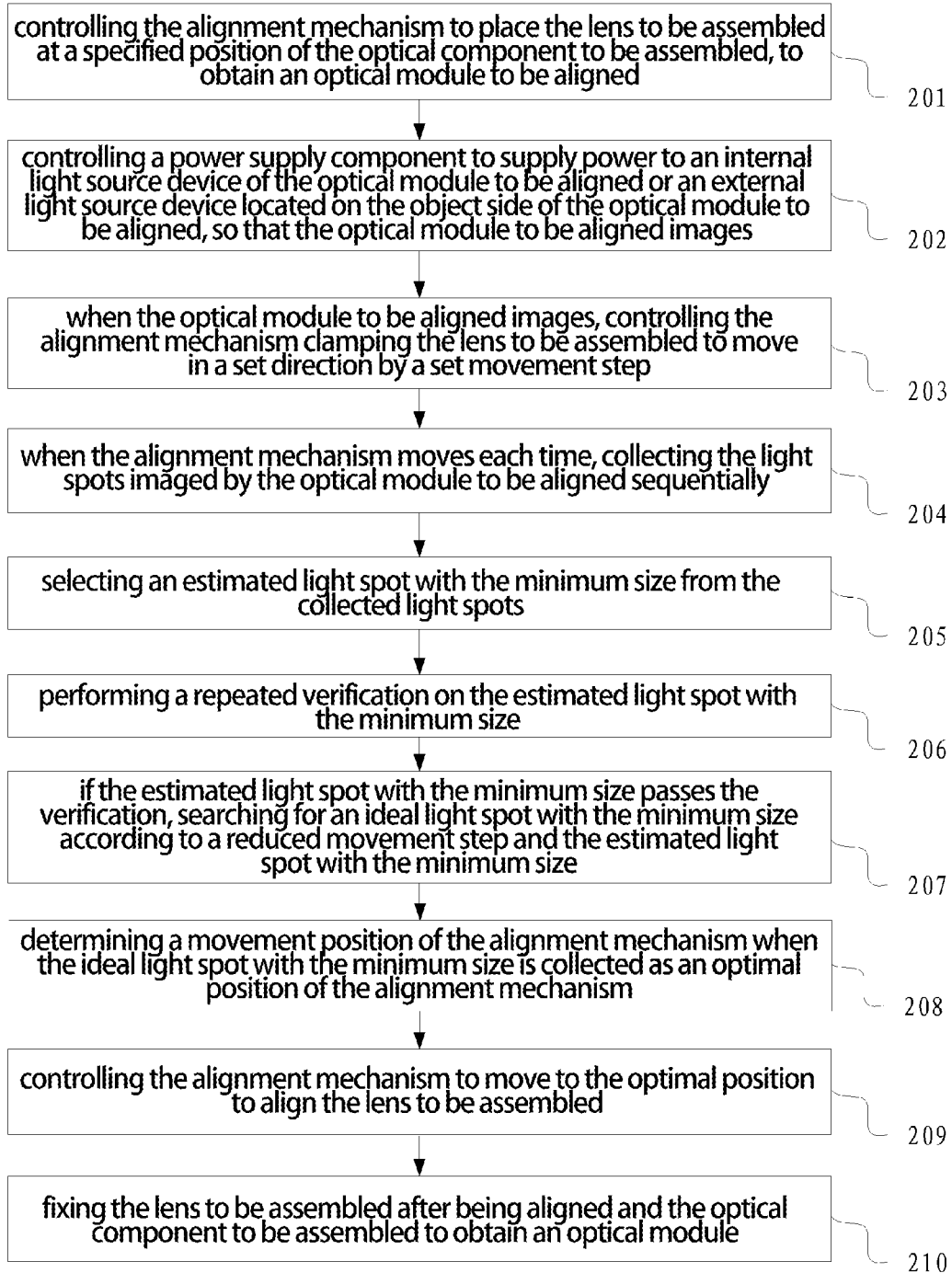
FIG. 2a is a method flowchart of a method of optical module assembly according to another embodiment of the present disclosure.

FIG. 2a is a method flowchart of a method of optical module assembly according to another embodiment of the present disclosure. In conjunction with FIG. 2a, the method includes:

Step 201: controlling the alignment mechanism to place the lens to be assembled at a specified position of the optical component to be assembled, to obtain an optical module to be aligned.

Step 202: controlling a power supply component to supply power to an internal light source device of the optical module to be aligned or an external light source device located on the object side of the optical module to be aligned, so that the optical module to be aligned images.

Step 203: when the optical module to be aligned images, controlling the alignment mechanism clamping the lens to be assembled to move in a set direction by a set movement step.

Step 204: when the alignment mechanism moves each time, collecting the light spots imaged by the optical module to be aligned sequentially.

Step 205: selecting an estimated light spot with the minimum size from the collected light spots.

Step 206: performing a repeated verification on the estimated light spot with the minimum size.

Step 207: if the estimated light spot with the minimum size passes the verification, searching for an ideal light spot with the minimum size according to a reduced movement step and the estimated light spot with the minimum size.

Step 208: determining a movement position of the alignment mechanism when the ideal light spot with the minimum size is collected as an optimal position of the alignment mechanism.

Step 209: controlling the alignment mechanism to move to the optimal position to align the lens to be assembled.

Step 210: fixing the lens to be assembled after being aligned and the optical component to be assembled to obtain an optical module.

In step 201, the optical component to be assembled is usually fixed on the fixing component, and its position accuracy may be determined by the fixing component. The specified position may be a position calculated according to the hardware parameters of the optical component and lens to be assembled and the optical performance requirements of the optical module, but the specified position may not be the position that allows the optical module to achieve the optimal optical performance.

In step 202, in the present embodiment, the alignment of the lens to be assembled may be achieved according to the actual imaging effect of the optical module to be aligned. Therefore, during the alignment process, the optical module to be aligned needs to image.

Optionally, in some optical modules, such as a micro-projection module, a light source device is built therein, and the power source component may supply power to these light source devices to make the optical module to be aligned images. In other optical modules, such as a camera module, there is no light source device inside. An external light source device may be provided on the object side of the optical module to be aligned. The power supply component may supply power to these light source devices to make the optical module to be aligned image.

In step 203, optionally, in order not to miss the other possible optimal positions, the alignment mechanism may move from the beginning or ending of the assembly area corresponding to the lens to be assembled in a set direction by a set movement step. The assembly area corresponding to the lens to be assembled may be an area near the specified position described in step 201, for example, an area of ±5 mm near the specified position. Then, the movement of the alignment mechanism may start from 5 mm in front of the specified position or start from 5 mm behind the specified position in the set direction by the set movement step.

In step 204, for each movement of the alignment mechanism, the image acquisition device may be controlled to sequentially collect the light spots imaged by the optical module to be aligned.

Figure 2B:
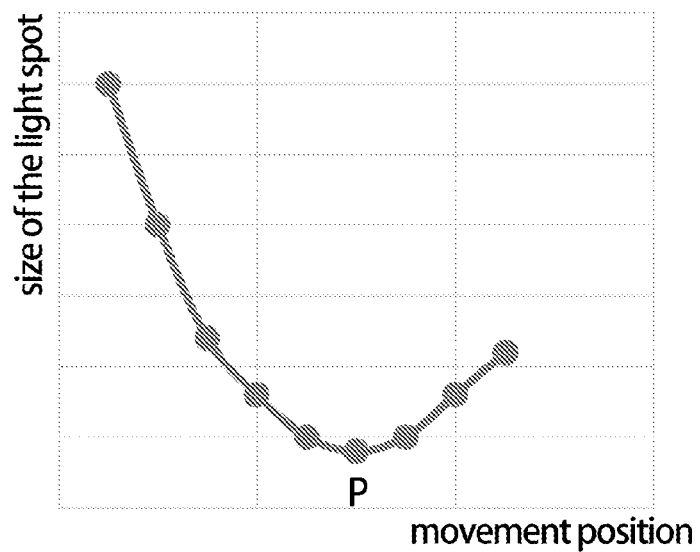
FIG. 2b is a schematic diagram of selecting an estimated light spot with the minimum size according to the present disclosure.

In step 205, when the alignment mechanism moves a plurality of times, the image acquisition device may collect a plurality of light spots. Optionally, a first light spot that meets a set condition is found as the estimated light spot with the minimum size among the plurality of light spots. The set condition is:

The sizes of a first number of light spots before a first light spot are all greater than a size of the first light spot, and the sizes of a second number of light spots after the first light spot are all less than the size of the first light spot. The first light spot refers to a light spot that satisfies the set condition. The "first" is merely for the convenience of expression of the light spot, and the order of collecting the light spots is not limited. The first number and the second number may be equal to or different from each other. Generally, the first number is determined by actual movement condition, and the second number may be 1-5, which is not limited in the embodiment of the present disclosure. Taking the light spot P shown in FIG. 2b as an example, the five light spots before the light spot P are larger than the light spot P, and the three light spots after the light spot P are larger than the light spot P. Therefore, the light spot P may be regarded as the estimated light spot with the minimum size.

It should be noted that, in an optional implementation manner, when the second number of light spots may determine that the first light spot is the estimated light spot with the minimum size, the alignment mechanism may no longer continue to move in the set direction, thereby efficiency regarding finding the light spot with the minimum size is increased.

In step 206, after determining the estimated light spot with the minimum size, to ensure accuracy, the estimated light spot with the minimum size may be repeatedly checked. Optionally, when the calibration is repeated, the movement position of the alignment mechanism when the estimated light spot with the minimum size is collected may be used as the suspicion position, the alignment mechanism is controlled to move to the suspicion position and a set number of movement positions before and after the suspicion position, and the light spots imaged by the optical module to be aligned when the alignment mechanism moves each time sequentially. The set number may be selected according to the actual situation, which is not limited in the embodiment of the present disclosure.

In step 207, if the size of the light spot collected when the alignment mechanism moves to a suspicion position is still the smallest among the light spots collected in each movement, the estimated light spot with the minimum size passes the verification and may be determined that the estimated light spot with the minimum size has been accurately collected.

Optionally, in the present embodiment, after the estimated light spot with the minimum size is determined, searching for the ideal light spot with the minimum size according to a reduced movement step and the estimated light spot with the minimum size may be implemented in the following manner:

First, the movement position of the alignment mechanism when the estimated light spot with the minimum size is collected is took as the estimated optimal position.

Then, the alignment mechanism is controlled to move to each of two sides of a center a set time of the reduced movement step, where the estimated position is set as the center. When the alignment mechanism moves to each of two sides of the center a respective set time, light spot imaged by the optical module is collected sequentially of each movement. The set time may be an experience value in relation to the movement step, which is not limited by the present embodiment.

Next, the ideal light spot with the minimum size is selected from the collected light spots.

Figure 2C:
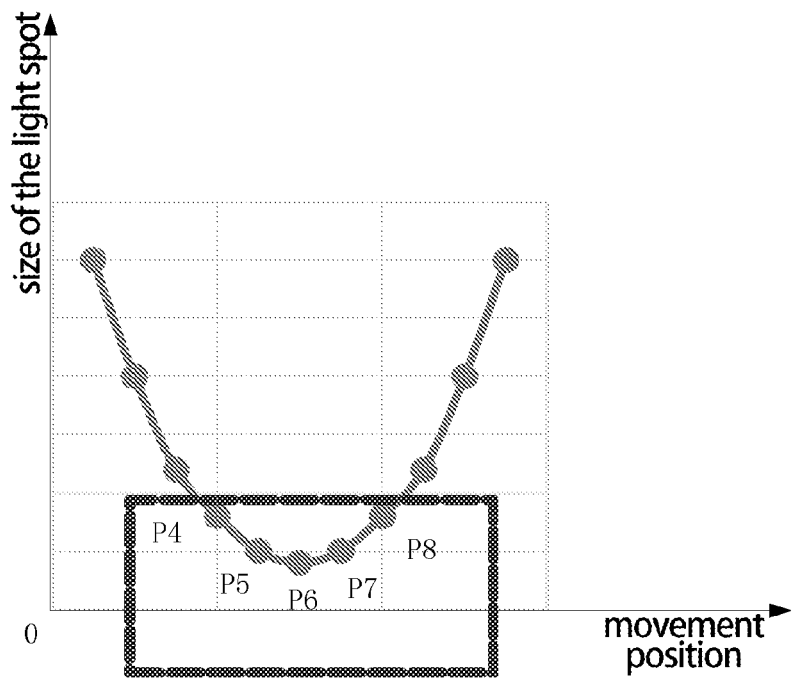
FIG. 2c is a schematic diagram of selecting an ideal light spot with the minimum size according to the present disclosure
Figure 2D:
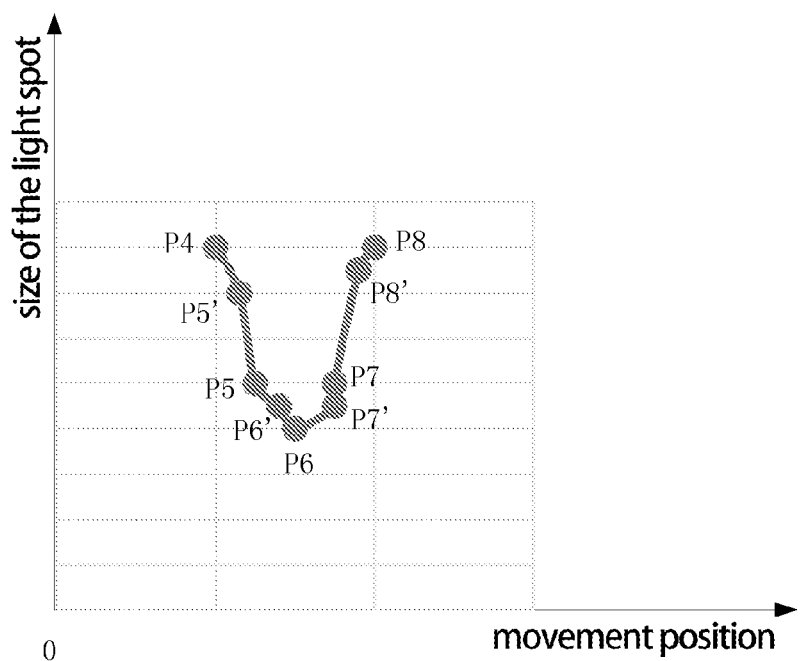
FIG. 2d is a schematic diagram of selecting an optimal position according to the present disclosure.

The method for searching for an ideal light spot with the minimum size according to the present embodiment will be further described below with reference to FIG. 2c and FIG. 2d by using a practical example. In FIG. 2c and FIG. 2d, the x-coordinate indicates the movement position of the alignment mechanism, and the y-coordinate indicates the size of the collected light spot. It is assumed that the light spot P6 in FIG. 2c is the estimated light spot with the minimum size determined in step 205. It is assumed that the movement position when the alignment mechanism collects P6 is position A, and the movement step is S.

In this step, the movement step may be reduced to be S/2, and the alignment mechanism may be controlled to start from position A, move to A−S/2 and collect light spot P6', move to A−S and collect light spot P5, move to A−3S/2 and collect light spot P5', and move to A−2S and collect light spot P4. Then the alignment mechanism may be controlled to start from position A, move to A+S/2 and collect light spot P7', move to A+S and collect light spot P7, move to A+3S/2 and collect light spot P8', and move to A+2S and collect light spot P8.

Next, a light spot with the minimum size is selected from the collected light spots P4, P5', P5, P6', P6, P7', P7, P8', and P8 as the ideal light spot with the minimum size.

Of course, above mentioned reduced step and the sequence of movement from the center position to both sides are only used to illustrate the technical solution of the present embodiment, and do not limit the protection scope of the embodiment of the present disclosure.

By adopting such an embodiment, the alignment accuracy of the lens to be assembled is further improved.

In step 208, after the optimal light spot with the minimum size is determined, the movement position of the alignment mechanism when the ideal light spot with the minimum size is collected is took as the optimal position of the alignment mechanism.

In step 209, after the optimal position is determined, the alignment mechanism is controlled to move to the optimal position to align the lens to be assembled.

In step 210, after the lens to be assembled is aligned, the lens to be assembled after being aligned and the optical component to be assembled may be fixed to obtain the optical module.

Optionally, before the lens to be assembled is aligned, the glue may be dispensed at a specific position of the optical component to be assembled in advance, and then the glue may be directly cured after the alignment to achieve the purpose of fixing the lens to be assembled and the optical component to be assembled. Optionally, after the lens to be assembled is aligned, glue may be dispensed and cured at a specific position of the optical component to be assembled and or lens to be assembled to achieve the purpose of fixing the lens to be assembled and the optical component to be assembled.

Optionally, in the present embodiment, UV (Ultraviolet Rays) glue, that is, shadowless glue, also known as photosensitive glue or ultraviolet curing glue, has high adhesion and rapid curing, which may indirectly improve the assembly effectiveness of optical module. In the curing stage, a UV lamp may be used to irradiate the dispensing area to further accelerate the curing speed.

In the present embodiment, during the assembly process of the optical module, when the optical module to be aligned images, the alignment mechanism clamping the lens to be assembled is first controlled to continuously move in a set direction by a set movement step to find the imaged estimated light spot with the minimum size, after the estimated light spot with the minimum size is found, the movement step of the alignment mechanism is reduces to conduct the searching for the ideal light spot with a minimum size. And finally, the lens to be assembled is adjusted to the optimal position according to the movement position of the alignment mechanism when the ideal light spot with a minimum size is collected. On the one hand, the search for the optimal position of the lens to be assembled is transformed into the search for the ideal light spot with the minimum size imaged by the optical module to be assembled, which reduces the alignment difficulty of the lens to be assembled. On the other hand, by the multiple searching processes of the light spot with the minimum size, the assembly accuracy of the optical module is improved.

Figure 3A:
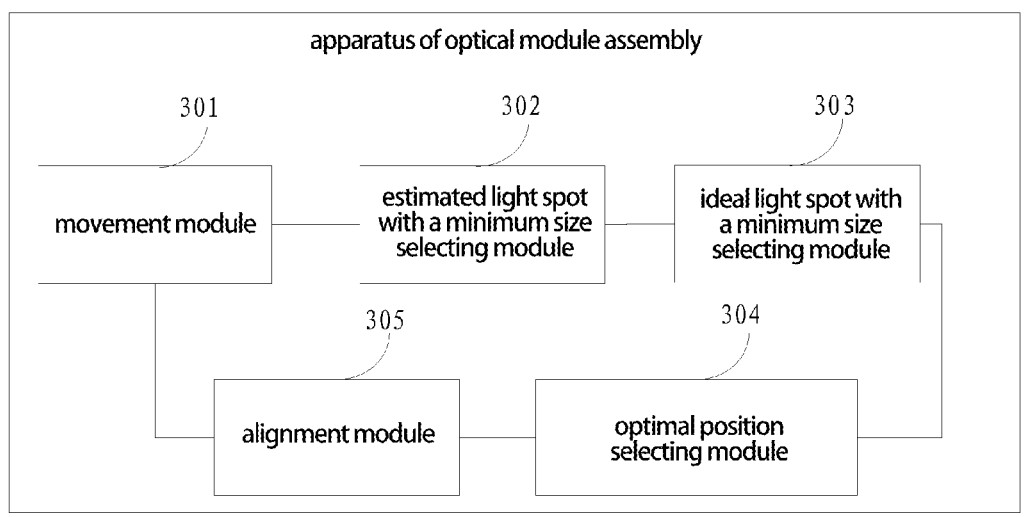
FIG. 3a is a schematic structural diagram of an apparatus of optical module assembly according to an embodiment of the present disclosure.

FIG. 3a is a schematic structural diagram of an apparatus of optical module assembly according to an embodiment of the present disclosure. In conjunction with FIG. 3a, the apparatus includes:

A movement module 301, which is configured to control an alignment mechanism clamping a lens to be assembled to move in a set direction by a set movement step when an optical module to be aligned images.

An estimated light spot with a minimum size selecting module 302, which is configured to when the alignment mechanism moves each time, collect light spots imaged by the optical module to be aligned sequentially, and select an estimated light spot with a minimum size from the collected light spots.

An ideal light spot with a minimum size selecting module 303, which is configured to search for an ideal light spot with a minimum size according to a reduced movement step and the estimated light spot with the minimum size.

An optimal position selecting module 304, which is configured to determine a movement position of the alignment mechanism when the ideal light spot with the minimum size is collected as an optimal position of the alignment mechanism.

An alignment module 305, which is configured to control the alignment mechanism to move to the optimal position to align the lens to be assembled.

Further optionally, the ideal light spot with a minimum size selecting module 303 is specifically configured to: take a movement position of the alignment mechanism when the estimated light spot with the minimum size is collected as an estimated optimal position, and control the alignment mechanism to move to each of two sides of a center a set time of the reduced movement step, wherein the estimated optimal position is set as the center; and collect the light spots imaged by the optical module to be aligned when the alignment mechanism moves to each of two sides of the center the set time of the reduced movement step sequentially, and select the ideal light spot with a minimum size from the collected light spots.

Further optionally, the estimated light spot with a minimum size selecting module 302 is specifically configured to: if sizes of a first number of light spots before a first light spot are all greater than a size of the first light spot, and if sizes of a second number of light spots after the first light spot are all less than the size of the first light spot, determining that the first light spot is the estimated light spot with the minimum size.

Further optionally, the movement module 301 is further configured to: control the alignment mechanism to move from a beginning or an ending of an assembly area corresponding to the lens to be assembled in the set direction by the set movement step.

Figure 3B:
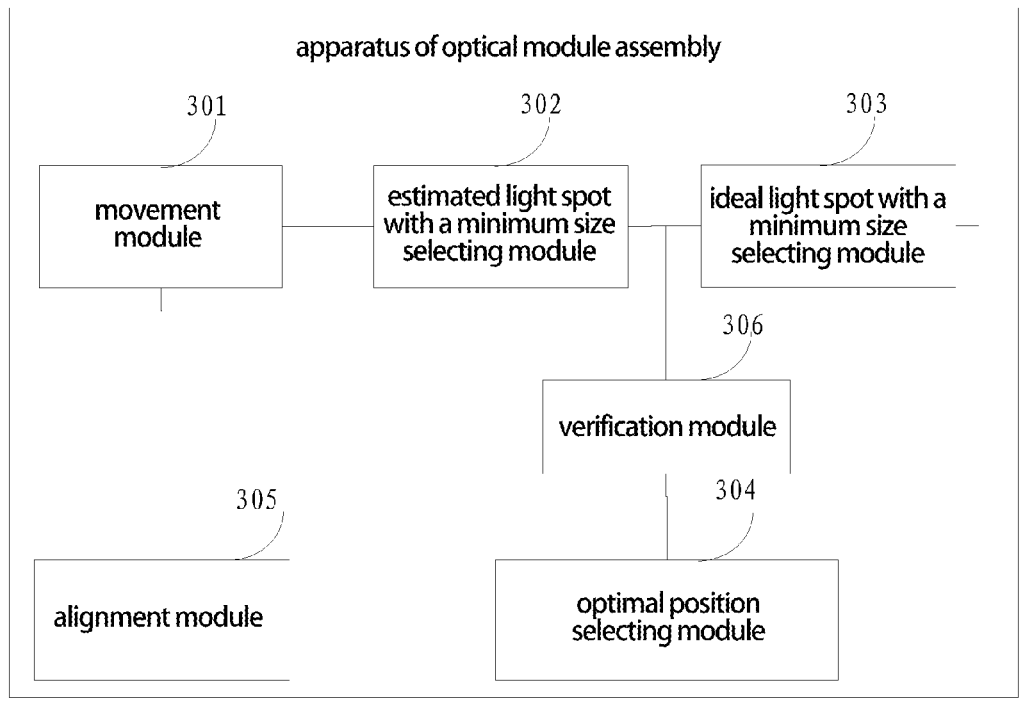
FIG. 3b is a schematic structural diagram of an apparatus of optical module assembly according to another embodiment of the present disclosure.

Further optionally, as shown by FIG. 3b, the apparatus further includes a verification module 306, where the verification module 306 is configured to: take a movement position of the alignment mechanism when the estimated light spot with the minimum size is collected as a suspicion position; control the alignment mechanism to move to the suspicion position and movement positions of a set number before and after the suspicion position, and collect, by an image acquisition device, light spots imaged by the optical module to be aligned when the alignment mechanism moves each time sequentially; and if in the light spots imaged by the optical module to be aligned when the alignment mechanism moves each time, the collected light spot is with the minimum size when the alignment mechanism moves to the suspicion position, determine that the estimated light spot with the minimum size passes a repeated verification.

Figure 3C:
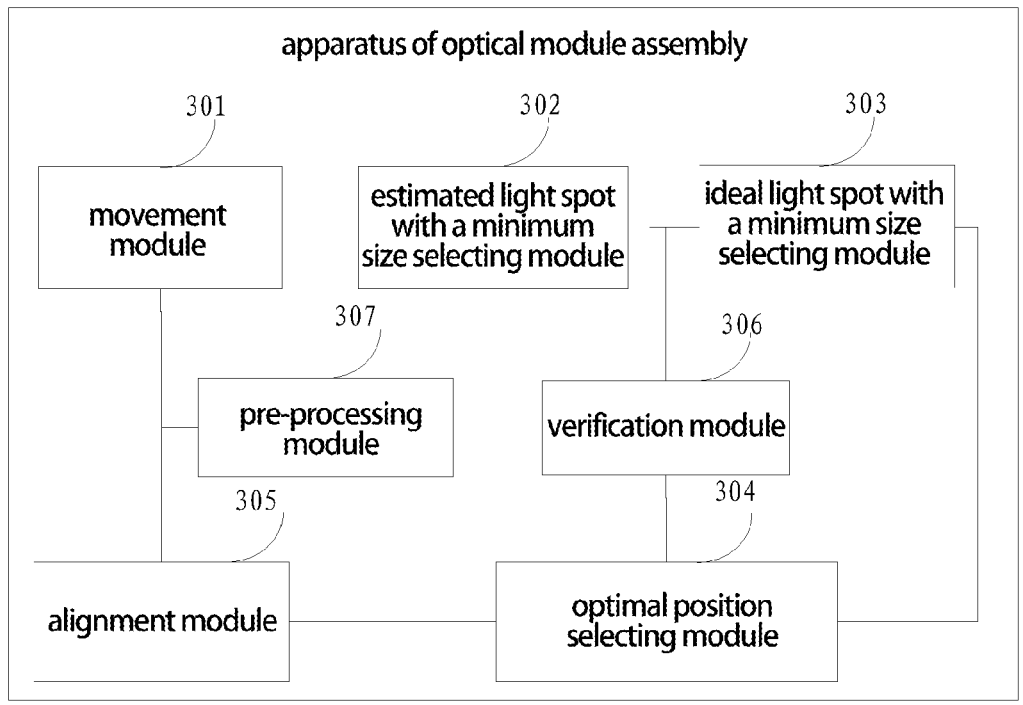
FIG. 3c is a schematic structural diagram of an apparatus of optical module assembly according to still another embodiment of the present disclosure.
Figure 4:
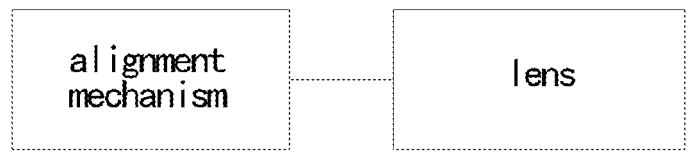
FIG. 4 shows a connection relationship between the alignment mechanism and the lens.
Figure 5:
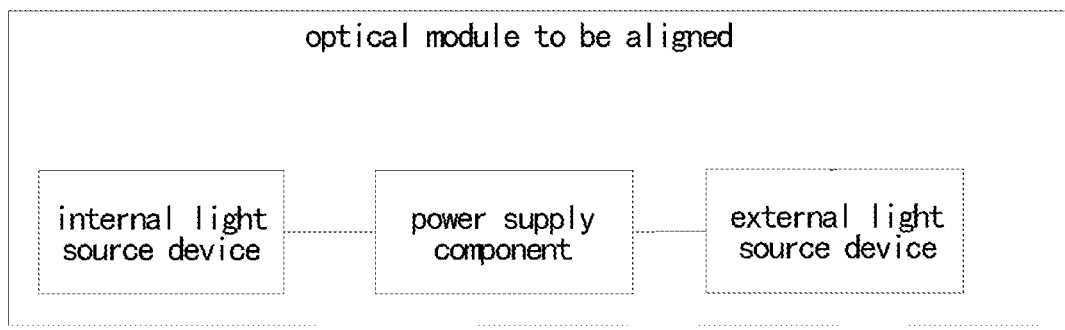
FIG. 5 is a schematic structural diagram of an optical module to be aligned.

Further optionally, as shown by FIG. 3c, the apparatus further includes a c 307, where the pre-processing module 307 is configured to: control the alignment mechanism to place the lens to be assembled at a specified position of an optical component to be assembled, to obtain the optical module to be aligned; and control a power supply component to supply power to an internal light source device of the optical module to be aligned or an external light source device located on an object side of the optical module to be aligned, so that the optical module to be aligned images.

In the present embodiment, in the present disclosure, during the assembly process of the optical module, when the optical module to be aligned images, the alignment mechanism clamping the lens to be assembled is first controlled to continuously move in a set direction by a set movement step to find the imaged estimated light spot with the minimum size, after the estimated light spot with the minimum size is found, the movement step of the alignment mechanism is reduces to conduct the searching for the ideal light spot with a minimum size. And finally, the lens to be assembled is adjusted to the optimal position according to the movement position of the alignment mechanism when the ideal light spot with a minimum size is collected. On the one hand, the search for the optimal position of the lens to be assembled is transformed into the search for the ideal light spot with the minimum size imaged by the optical module to be assembled, which reduces the alignment difficulty of the lens to be assembled. On the other hand, by the multiple searching processes of the light spot with the minimum size, the assembly accuracy of the optical module is improved.

It should be noted that the expressions herein of "first", "second", etc. are intended to distinguish between different messages, devices, modules, etc., and are not intended to represent a sequential order, nor is it intended to limit that "first" and "second" are of different types.

It is also to be noted that terms "include", "contain" or any other variants thereof are intended to include nonexclusive inclusions, thereby ensuring that a commodity or system including a series of elements not only includes those elements but also includes other elements which are not clearly listed or further includes elements intrinsic to the commodity or the system. Under the condition of no more restrictions, an element defined by statement "including a/an" does not exclude existence of another element which is the same in a commodity or system including the element.

The above is only the embodiment of the present disclosure and not intended to limit the present disclosure. Those skilled in the art may make various modifications and variations to the present disclosure. Any modifications, equivalent replacements, improvements and the like made within the spirit and principle of the present disclosure shall fall within the scope of the claims of the present disclosure.

What is claimed is:

1. A method of optical module assembly, comprising:
   when an optical module to be aligned images, controlling an alignment mechanism clamping a lens to be assembled to move in a set direction by a first movement step;
   when the alignment mechanism moves each time, collecting light spots imaged by the optical module to be aligned sequentially, and selecting an estimated light spot with a minimum size from the collected light spots; wherein the estimated light spot with the minimum size is a collected light spot with a size less than all sizes of a first number of light spots before the estimated light spot with a minimum size, and less than all sizes of a second number of light spots after the estimated light spot with a minimum size;
   controlling the alignment mechanism to move by a second movement step, and searching for an ideal light spot with a minimum size according to the second movement step and the estimated light spot with the minimum size; wherein the second movement step is shorter than the first movement step;
   determining a movement position of the alignment mechanism when the ideal light spot with the minimum size is collected as an optimal position of the alignment mechanism; and
   controlling the alignment mechanism to move to the optimal position to align the lens to be assembled.

2. The method according to claim 1, wherein the searching for an ideal light spot with a minimum size according to a reduced movement step and the estimated light spot with the minimum size comprises:
   taking a movement position of the alignment mechanism when the estimated light spot with the minimum size is collected as an estimated optimal position, and controlling the alignment mechanism to move to each of two sides of a center a set time of the reduced movement step, wherein the estimated optimal position is set as the center; and collecting the light spots imaged by the optical module to be aligned when the alignment mechanism moves to each of two sides of the center the set time of the reduced movement step sequentially, and selecting the ideal light spot with a minimum size from the collected light spots.

3. The method according to claim 1, wherein the controlling an alignment mechanism clamping a lens to be assembled to move in a set direction by a first movement step further comprises:

controlling the alignment mechanism to move from a beginning or an ending of an assembly area corresponding to the lens to be assembled in the set direction by the first movement step.

4. The method according to claim 1, wherein before the searching for an ideal light spot with a minimum size according to a reduced movement step and the estimated light spot with the minimum size further comprises:

taking a movement position of the alignment mechanism when the estimated light spot with the minimum size is collected as a suspicion position;

controlling the alignment mechanism to move to the suspicion position and movement positions of a set number before and after the suspicion position, and collecting, by an image acquisition device, light spots imaged by the optical module to be aligned when the alignment mechanism moves each time sequentially; and if in the light spots imaged by the optical module to be aligned when the alignment mechanism moves each time, the collected light spot is with the minimum size when the alignment mechanism moves to the suspicion position, determining that the estimated light spot with the minimum size passes a repeated verification.

5. The method according to claim 1, wherein before the optical module to be aligned imaging further comprises:

controlling the alignment mechanism to place the lens to be assembled at a specified position of an optical component to be assembled, to obtain the optical module to be aligned; and controlling a power supply component to supply power to an internal light source device of the optical module to be aligned or an external light source device located on an object side of the optical module to be aligned, so that the optical module to be aligned images.

6. An apparatus of optical module assembly, comprising: a movement module, an estimated light spot with a minimum size selecting module, an ideal light spot with a minimum size selecting module, an optimal position selecting module, and an alignment module; wherein, the movement module, the estimated light spot with a minimum size selecting module, the ideal light spot with a minimum size selecting module, the optimal position selecting module, and the alignment module are connected sequentially; and wherein, the movement module, configured to control an alignment mechanism clamping a lens to be assembled to move in a set direction by a first movement step when an optical module to be aligned images;

the estimated light spot with a minimum size selecting module, configured to when the alignment mechanism moves each time, collect light spots imaged by the optical module to be aligned sequentially, and select an estimated light spot with a minimum size from the collected light spots; wherein the estimated light spot with the minimum size is a collected light spot with a size less than all sizes of a first number of light spots before the estimated light spot with a minimum size, and less than all sizes of a second number of light spots after the estimated light spot with a minimum size;

the ideal light spot with a minimum size selecting module, configured to control the alignment mechanism to move by a second movement step, and search for an ideal light spot with a minimum size according to a reduced movement step and the estimated light spot with the minimum size; wherein the second movement step is shorter than the first movement step;

the optimal position selecting module, configured to determine a movement position of the alignment mechanism when the ideal light spot with the minimum size is collected as an optimal position of the alignment mechanism; and the alignment module, configured to control the alignment mechanism to move to the optimal position to align the lens to be assembled.

7. The apparatus according to claim 6, wherein the ideal light spot with a minimum size selecting module is specifically configured to:

take a movement position of the alignment mechanism when the estimated light spot with the minimum size is collected as an estimated optimal position, and control the alignment mechanism to move to each of two sides of a center a set time of the reduced movement step, wherein the estimated optimal position is set as the center; and collect the light spots imaged by the optical module to be aligned when the alignment mechanism moves to each of two sides of the center the set time of the reduced movement step sequentially, and select the ideal light spot with a minimum size from the collected light spots.

8. The apparatus according to claim 6, wherein the movement module is further configured to:

control the alignment mechanism to move from a beginning or an ending of an assembly area corresponding to the lens to be assembled in the set direction by the first movement step.

9. The apparatus according to claim 6, further comprising a verification module, wherein the verification module is connected to the estimated light spot with the minimum size selecting module and the optimal position selecting module, and is configured to:

take a movement position of the alignment mechanism when the estimated light spot with the minimum size is collected as a suspicion position;

control the alignment mechanism to move to the suspicion position and movement positions of a set number before and after the suspicion position, and collect, by an image acquisition device, light spots imaged by the optical module to be aligned when the alignment mechanism moves each time sequentially; and if in the light spots imaged by the optical module to be aligned when the alignment mechanism moves each time, the collected light spot is with the minimum size when the alignment mechanism moves to the suspicion position, determine that the estimated light spot with the minimum size passes a repeated verification.

10. The apparatus according to claim 6, further comprising a pre-processing module, wherein the pre-processing module is connected to the movement module, and is configured to:
- control the alignment mechanism to place the lens to be assembled at a specified position of an optical component to be assembled, to obtain the optical module to be aligned; and
- control a power supply component to supply power to an internal light source device of the optical module to be aligned or an external light source device located on an object side of the optical module to be aligned, so that the optical module to be aligned images.

* * * * *